(12) United States Patent
Feng et al.

(10) Patent No.: US 11,703,431 B2
(45) Date of Patent: Jul. 18, 2023

(54) DEVICE AND METHOD FOR TESTING TENSILE RESISTANCE OF MULTIPLE-ROW GROUPED PILLARS IN INCLINED GOAF

(71) Applicant: Taiyuan University of Technology, Shanxi (CN)

(72) Inventors: Guorui Feng, Taiyuan (CN); Xudong Shi, Taiyuan (CN); Jinwen Bai, Taiyuan (CN); Xinyu Yang, Taiyuan (CN); Boqiang Cui, Taiyuan (CN); Xianjie Du, Taiyuan (CN)

(73) Assignee: Taiyuan University of Technology, Taiyuan (CN)

( * ) Notice: Subject to any disclaimer, the term of this patent is extended or adjusted under 35 U.S.C. 154(b) by 21 days.

(21) Appl. No.: 17/585,960

(22) Filed: Jan. 27, 2022

(65) Prior Publication Data
US 2022/0244152 A1   Aug. 4, 2022

(30) Foreign Application Priority Data

Feb. 4, 2021 (CN) .......................... 202110151075.X

(51) Int. Cl.
*G01N 3/10* (2006.01)
*G01N 3/06* (2006.01)
(Continued)

(52) U.S. Cl.
CPC ................. *G01N 3/10* (2013.01); *G01N 3/06* (2013.01); *G01N 3/02* (2013.01); *G01N 3/08* (2013.01); *G01N 2203/0003* (2013.01); *G01N 2203/0017* (2013.01); *G01N 2203/0048* (2013.01); *G01N 2203/04* (2013.01); *G01N 2203/06* (2013.01)

(58) Field of Classification Search
CPC .. G01N 3/10; G01N 3/08; G01N 3/06; G01N 3/02; G01N 2203/0017; G01N 2203/0048; G01N 2203/04; G01N 2203/06; G01N 2203/0003
See application file for complete search history.

(56) References Cited

U.S. PATENT DOCUMENTS 7,370,537 B2 * 5/2008 O'Brien ................. G01N 29/14
73/818
8,281,666 B2 * 10/2012 Jevons ..................... G01N 3/24
73/818

(Continued)

*Primary Examiner* — Jonathan M Dunlap
(74) *Attorney, Agent, or Firm* — Harness, Dickey & Pierce, P.L.C.

(57) ABSTRACT

A device and a method for testing tensile resistance of multiple-row grouped pillars in an inclined goaf are provided. The bottoms of stands of the device are connected with a testing machine base, and the tops of the stands of the device are connected with a transverse frame; an upper slideable clamping seat and a lower slideable clamping seat are semi-cylindrical blocks, multiple lower loading jaws that are positioned to have a same central line are arranged on the lower slideable clamping seat, each of the lower loading jaws is opposite to a corresponding one of the upper loading jaws, the lower loading jaws are welded to the lower slideable clamping sea to test the tensile resistance of samples together; the upper part of the upper slideable clamping seat is connected with an upper pressure disk, and the lower slideable clamping seat is connected with a lower pressure disk.

12 Claims, 8 Drawing Sheets

(51) Int. Cl.
*G01N 3/02* (2006.01)
*G01N 3/08* (2006.01)

(56) References Cited

U.S. PATENT DOCUMENTS

| | | | |
|---|---|---|---|
| 9,983,106 B2* | 5/2018 | Han | G01N 3/08 |
| 10,641,690 B2* | 5/2020 | Brovold | G01N 3/20 |
| 2006/0101913 A1* | 5/2006 | O'Brien | G01M 13/04 |
| | | | 73/587 |
| 2011/0000307 A1* | 1/2011 | Jevons | G01N 3/08 |
| | | | 73/818 |
| 2017/0299486 A1* | 10/2017 | Han | G01N 33/24 |
| 2018/0195941 A1* | 7/2018 | Brovold | G01N 3/08 |
| 2021/0190755 A1* | 6/2021 | Martysevich | G01N 33/24 |

* cited by examiner

DEVICE AND METHOD FOR TESTING TENSILE RESISTANCE OF MULTIPLE-ROW GROUPED PILLARS IN INCLINED GOAF

CROSS REFERENCE TO RELATED APPLICATION

This patent application claims the benefit and priority of Chinese Patent Application No. 202110151075.X filed on Feb. 4, 2021, the disclosure of which is incorporated by reference herein in its entirety as part of the present application.

TECHNICAL FIELD

The present disclosure relates to a device and a method for testing tensile resistance of multiple-row grouped pillars in an inclined goaf, and belongs to the technical field of mechanics tests of mining rocks.

BACKGROUND ART

Due to the backward mining method in the old mining period, a large number of remaining coal pillars are formed in many mines in China, and mainly comprise cutter pillar type remaining coal pillars, room pillar type remaining coal pillars, strip type remaining coal pillars, short wall type remaining coal pillars, roadway mining type remaining coal pillars, warehouse type remaining coal pillars, skip mining type remaining coal pillars and the like. Those coal pillars are densely distributed in space, are different in shapes, influence one another, are intricate and complex and different in sizes, and are combined in clusters to form a coal pillar group. Similarly, ore pillar group is also formed in a goaf during metal mine mining to bear overburden load and ensure long-term stability of a stope.

Overburden rock movement and surface subsidence can be effectively controlled through filling mining. In recent years, in order to solve the technical problems that filling materials are insufficient in source and high in cost, the technical methods such as partial filling, roadway-side filling, strip filling, pierstud filling, local filling, short wall filling, strip filling, interval filling, pillar-side filling, structural filling, functional filling and framework type filling are applied and popularized in many mines. According to the filling mining technical method described above, filling pillars (concrete pillars) with different sizes/forms are inevitably reserved in the goaf, are distributed in the form of grouped pillars, and are combined to form a filling body grouped pillars or a concrete grouped pillars.

The coal pillar group, the ore pillar group, the filling pillar group and the concrete group discussed above are herein collectively referred to as grouped pillars. The original intention of reserving the grouped pillars in the stope is to bear the overburden load and ensure the long-term stability of the goaf. Long-term stability of the stope grouped pillars is a scientific problem of concern. However, under the coupling actions of overburden load, disturbance load, mine water erosion, sulfate corrosion, chlorine salt corrosion, natural weathering and the like, the bearing capacity of the grouped pillars in the stope is gradually weakened, which may cause instability of a grouped pillar system, and in turn lead to disasters such as overlying rock collapse and surface subsidence. Thus, serious potential safety hazards are brought to safe and efficient mining of coal resources.

There exists mutual influence among independent individuals of the stope group pillars. And overburden load, disturbance load and the like are not borne by the single pillar body in the stope, but are mainly borne by the grouped pillars system together. If the local instability failure of one pillar body occurs, the overburden load and the disturbance load will be transferred, which further causes the instability failure of the adjacent pillar groups, and leads to the domino chain type instability of the grouped pillars in the stope. Therefore, it is very necessary to test the overall bearing capacity of the grouped pillar system in the stope. At present, the on-site monitoring of the overall bearing capacity of the stope grouped pillars is difficult to implement, and only a small-size grouped pillar sample in a laboratory can be used for testing. A traditional testing machine can only load a single pillar sample, and cannot load a grouped pillar sample. In practical engineering, a coal seam is usually formed with a certain inclination angle and is not horizontally distributed, so that the bearing capacity of the system of the grouped pillars with variable angles is very necessary to research. However, the uniaxial bearing capacity of the system of the grouped pillars with variable angles cannot be researched by the traditional testing machine.

In conclusion, there is an urgent need to develop a device and method for testing the overall bearing capacity of the stope grouped pillars, so that the overall bearing capacity of the stope group pillar system is obtained, the mutual influence relation among group pillar individuals is obtained, to lay a foundation for revealing chain type instability response characteristics and mechanisms of the stope group pillars, and provide guidance for researching and developing chain type instability prevention and control technology the stope group pillar. The present disclosure intends to provide a device and a method for testing tensile resistance of multiple-row grouped pillars in an inclined goaf, focusing on the single-row group pillars in the horizontal goaf.

SUMMARY

Some embodiments aim to provide a device and a method for testing tensile resistance of multiple-row grouped pillars in an inclined goaf, which realizes synchronous loading multiple samples such as a coal sample, a rock sample, a filling body sample, a concrete sample, a coal-filling sample and a rock-filling sample. In this way, the mutual influence relationship among individuals of the grouped pillars is obtained. A foundation is laid for revealing characteristics and mechanisms for a chain type instability response of the grouped pillars in the stope, and the guidance is provided for researching and development of the prevention and control technologies for the chain type instability of the grouped pillars in the stope.

The device for testing tensile resistance of multiple-row grouped pillars in an inclined goaf provided by the present disclosure includes a testing machine base, stands, a lower pressure disk, an upper pressure disk, an upper slideable clamping seat, a lower slideable clamping seat, a transverse frame, scale lines, protection rings, a hemispherical seat, fixed rings, fixed bolts, arc-shaped clamping blocks, fixed rolling shafts, arc-shaped grooves, upper loading jaws, lower loading jaws, an upper pressing plate, fixed blocks and a force control assembly.

The bottoms of the stands are connected with the testing machine base, and the tops of the stands are connected with the transverse frame; the upper slideable clamping seat and the lower slideable clamping seat are semi-cylindrical blocks, multiple lower loading jaws that are positioned to have a same central line are arranged on the lower slideable clamping seat, each of the lower loading jaws is opposite to a corresponding one of the upper loading jaws, the lower loading jaws are welded to the lower slideable clamping seat to test the tensile resistance of samples together; an upper part of the upper slideable clamping seat is connected with the upper pressure disk, and the lower slideable clamping seat is connected with the lower pressure disk; each of the upper loading jaws and a corresponding one of the lower loading jaws are connected through a directional bearing, and after each of the upper loading jaws and the corresponding one of the lower loading jaws are snap-engaged with each other, an elliptical cavity is formed between each upper loading jaw and the corresponding one of the lower loading jaws and is used for placing a respective one of the samples, so that eccentric loading of the sample is prevented.

The force control assembly includes a hydraulic pushing shaft, a hydraulic oil cylinder and pressure sensors; each of the pressure sensors is connected with a microcomputer through a control circuit and is used for accurately controlling a force borne by a corresponding one of the samples; and the hydraulic pushing shaft is controlled and adjusted by the hydraulic oil cylinder, so as to load the samples at the same speed or at different speeds and to simulate a situation that the samples are subjected to an uniform pressure force and a non-uniform pressure force.

In the device, the goaf is formed after an inclined coal seam with a tilt angle of −50° to 50° is mined; the grouped pillars include one type of a coal pillar group, an ore pillar group, a filling pillar group, a concrete pillar group, first grouped pillars of mixing coal pillars and filling pillars, second grouped pillars of mixing ore pillars and the filling pillars, and third grouped pillars of mixing the coal pillars and concrete pillars; and the cross sections of the grouped pillars are circular, rectangular, triangular or trapezoidal.

In the device, four protection rings are arranged on the testing machine base, and each of the four protection rings is installed with a corresponding one of the stands.

In the device, a first fixed ring of the fixed rings is arranged between the upper pressure disk and the upper slideable clamping seat and the second fixed ring of the fixed rings is arranged between the lower pressure disk and the lower slideable clamping seat, each of the fixed bolts is arranged in the middle of a corresponding one of the first fixed ring and second fixed ring, to connect the upper slideable clamping seat with the first fixed ring and connect the lower slideable clamping seat with the second fixed ring.

The upper pressure disk, and the lower pressure disk are connected and fixed with the first fixed ring and second fixed ring through the arc-shaped clamping blocks respectively, one of the arc-shaped clamping blocks that is between the upper pressure disk and the first fixed ring has a same structure as an other one of the arc-shaped clamping blocks that is between the lower pressure disk and the second fixed ring, the front end and the rear end of the arc-shaped clamping block are each provided with a fixed rolling shaft, the bottom of the upper pressure disk and the top of the lower pressure disk are each provided with one of the fixed blocks, the fixed block is internally provided with an arc-shaped groove with a hollow interior, the hollow interior of the corresponding one of the arc-shaped grooves is used for placing one of the arc-shaped clamping blocks, the upper bottom surface and the lower bottom surface of the arc-shaped groove are surfaces with recesses, a central angle of each of the recesses of the surfaces is 2°, a corresponding one of the fixed rolling shafts is positioned between the upper bottom surface and the lower bottom surface of the each arc-shaped groove, a rotation angle of the upper slideable clamping seat and the lower slideable clamping seat is adjusted and controlled by rotating each of the fixed rolling shafts to be matched with a corresponding one of the arc-shaped grooves, and an inclination angle of the inclined goaf is simulated.

In the device, scale lines are arranged on the outer edges of both the upper slideable clamping seat and the lower slideable clamping seat, so that the inclination angle is accurately adjusted and controlled.

In the device, the length and the width of the lower loading jaw are 150 mm and 150 mm, respectively.

The device not only is capable of testing the tensile resistance of the system of the grouped pillars which is horizontal, but also is capable of testing tensile resistance of the system of the grouped pillars with variable angles; the tensile resistance of a single sample of coal, rock, filling body, concrete, coal-filling or rock-filling sample is capable of being researched, and the tensile resistance of multiple samples of the system of the grouped pillars including coal, rock, filling body, concrete, coal-filling and rock-filling sample is also capable of being researched.

The present disclosure provides a method for testing tensile resistance of multiple-row grouped pillars in an inclined goaf, including the steps as follows: researching distribution positions, forms and sizes of the grouped pillars remained in a horizontal goaf within a to-be-tested range comprehensively by virtue of technical means for supplementary exploration by utilizing original geological technical data of a mine; determining sizes and a number of the samples to be tested based on information of the grouped pillars remained in the horizontal goaf, wherein the information is obtained in a step of researching the distribution positions, the forms and the sizes of the grouped pillars remained in the horizontal goaf within the to-be-tested range comprehensively by virtue of the technical means for supplementary exploration by utilizing the original geological technical data of the mine; drilling and obtaining the samples with appropriate sizes by using a special coal rock coring machine in a multi-speed manual feeding mode, and cutting and grinding the samples to shapes and sizes required for a test by using the coal rock cutting machine; installing a respective one of the samples in the cavity between each of the upper loading jaws and the corresponding one of the lower loading jaws on the lower slideable clamping seat; drawing two parallel loading base lines at two ends of each of the samples along an axis direction of the sample, and placing two filler strips along the two loading base lines respectively, and fixing the two filler strips through a corresponding one of the upper loading jaws and a corresponding one of the lower loading jaws; rotating the upper slideable clamping seat and the lower slideable clamping seat to a target angle; resetting a force value of each of the pressure sensors, and carrying out preloading; setting a loading speed of the hydraulic pushing shaft after the preloading is completed, and carrying out loading; restoring the upper slideable clamping seat and the lower slideable clamping seat to be horizontal, and controlling the hydraulic pushing shaft to be unloaded by the hydraulic oil cylinder after the loading is completed, and ending the test.

The present disclosure has the beneficial effects as follows.

According to some embodiments, simultaneous loading of multiple samples such as a coal sample, a rock sample, a filling body sample, a concrete sample, a coal-filling sample and a rock-filling sample may be realized under a condition of variable angles, and the simulation of the damage to the loading of multiple ore pillars may be realized. Further, the loading angles of the samples may be continuously changed, and the tensile resistance of the system of the grouped pillars under the condition of different angles may be researched.

Reference signs: 1 testing machine base; 2 stands; 3 lower pressure disk; 4 upper pressure disk; 5 upper slideable clamping seat; 6 lower slideable clamping seat; 7 transverse frame; 8 hydraulic pushing shaft; 9 hydraulic oil cylinder; 10 pressure sensor; 11 scale line; 12 protection ring; 13 hemispherical seat; 14 fixed ring; 15 fixed bolt; 16 arc-shaped clamping block; 17 fixed rolling shaft; 18 arc-shaped groove; 19 upper loading jaw; 20 lower loading jaw; 21 upper pressing plate; 22 fixed block; and 23 sample.

DETAILED DESCRIPTION OF THE EMBODIMENTS

The present disclosure is further illustrated below through embodiments, but not limited to the following embodiments.

Embodiment I

Figure 1:
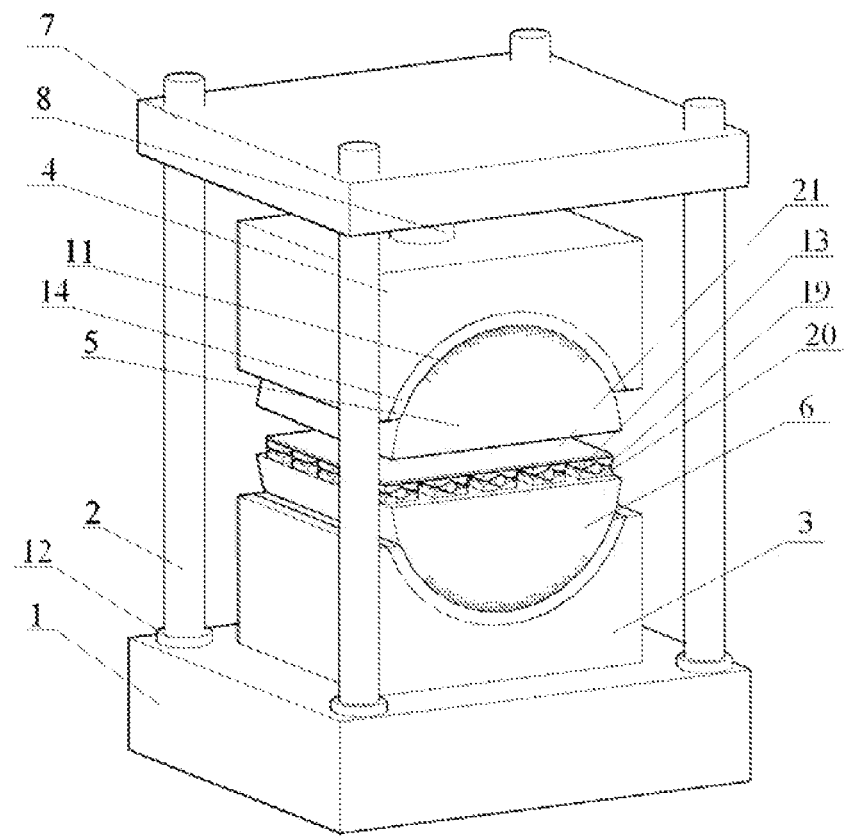
FIG. 1 is a schematic diagram showing a structure of the present disclosure.
Figure 2:
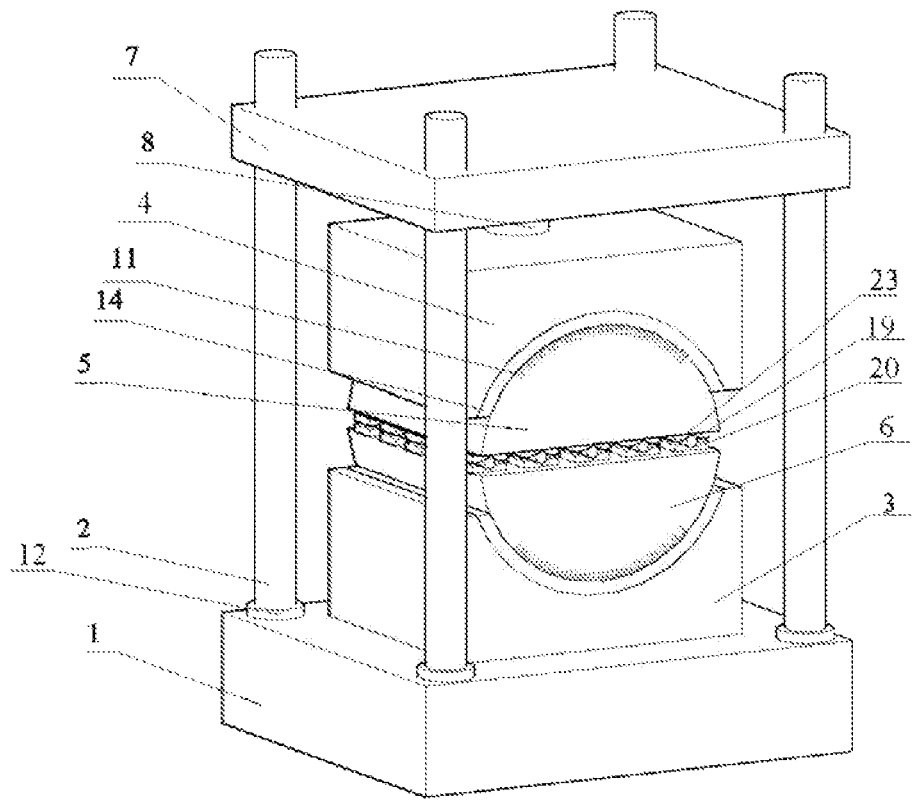
FIG. 2 is a schematic diagram showing a working scene with a horizontal angle according to the present disclosure.
Figure 3:
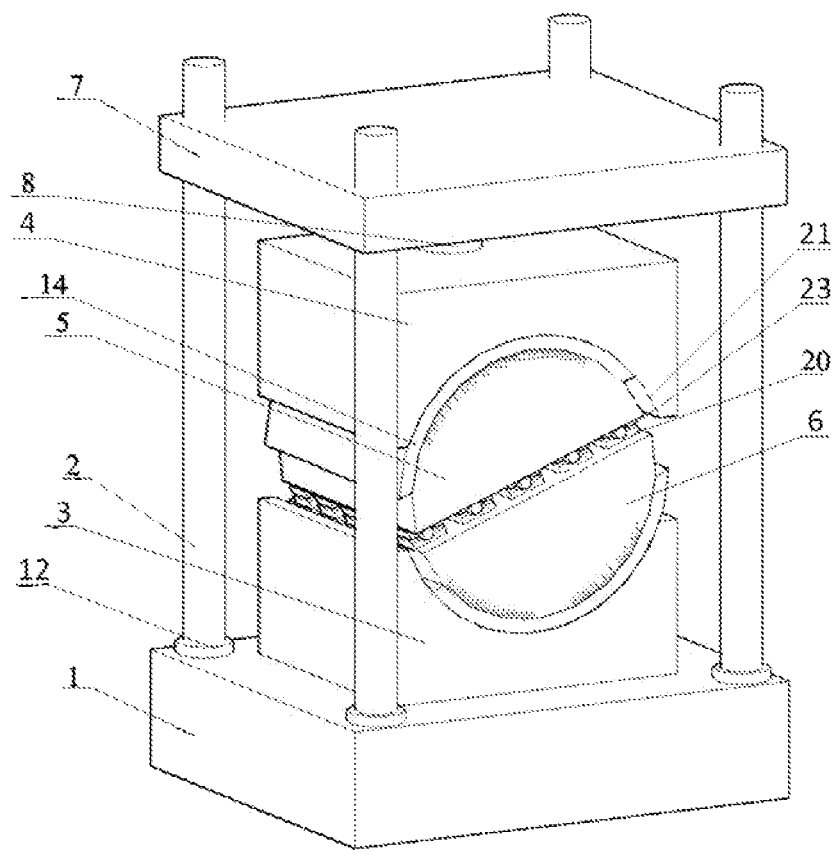
FIG. 3 is a schematic diagram showing a working scene with an inclined angle according to the present disclosure.
Figure 4:
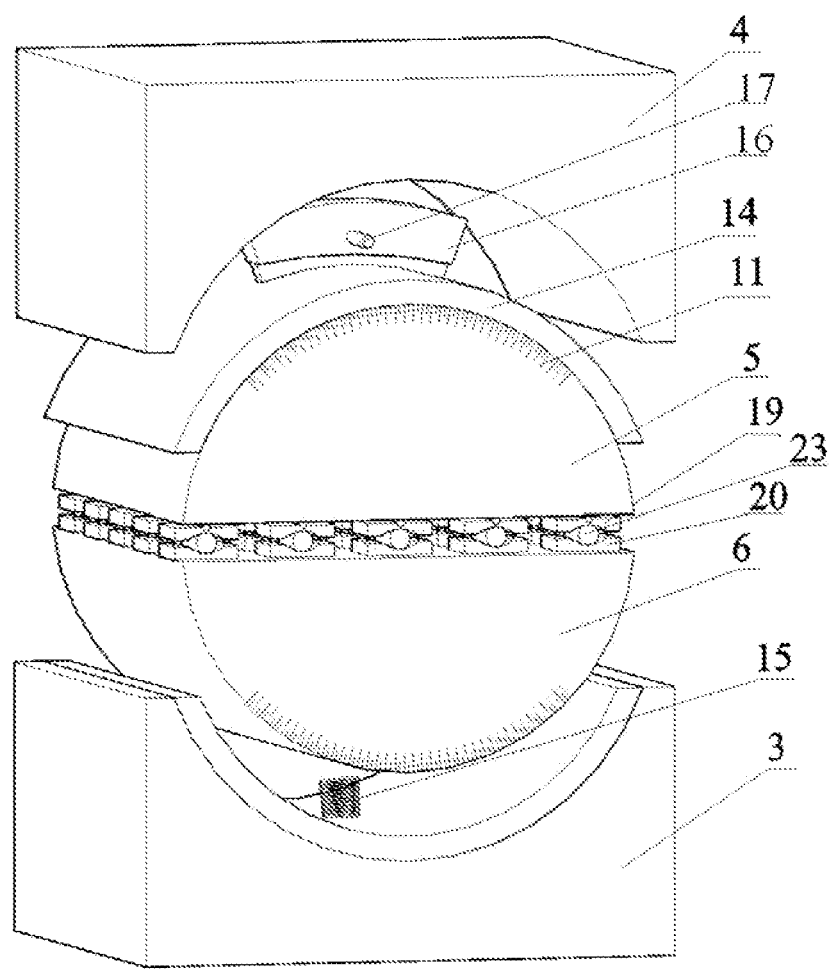
FIG. 4 is a schematic diagram showing combination of a loading structure according to the present disclosure.
Figure 5:
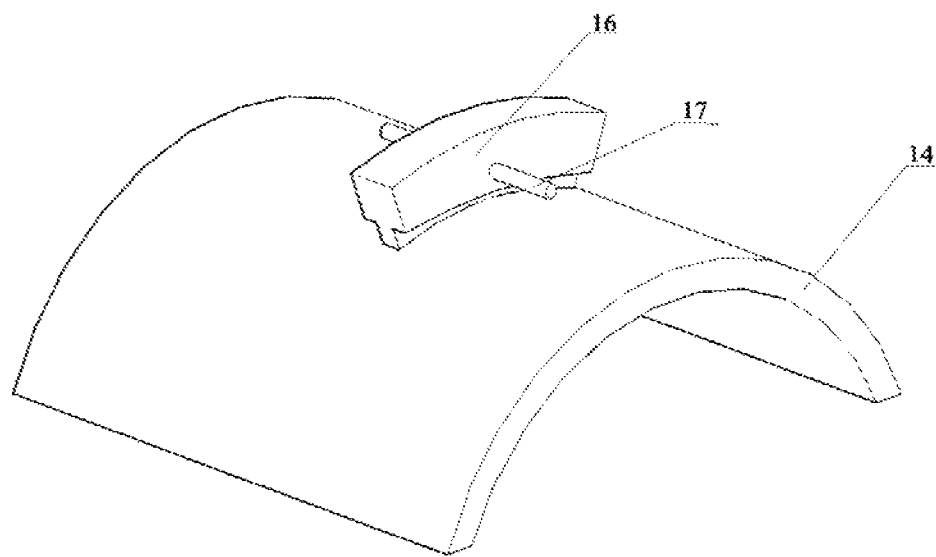
FIG. 5 is a structural schematic diagram of an arc-shaped clamping block according to the present disclosure.
Figure 6:
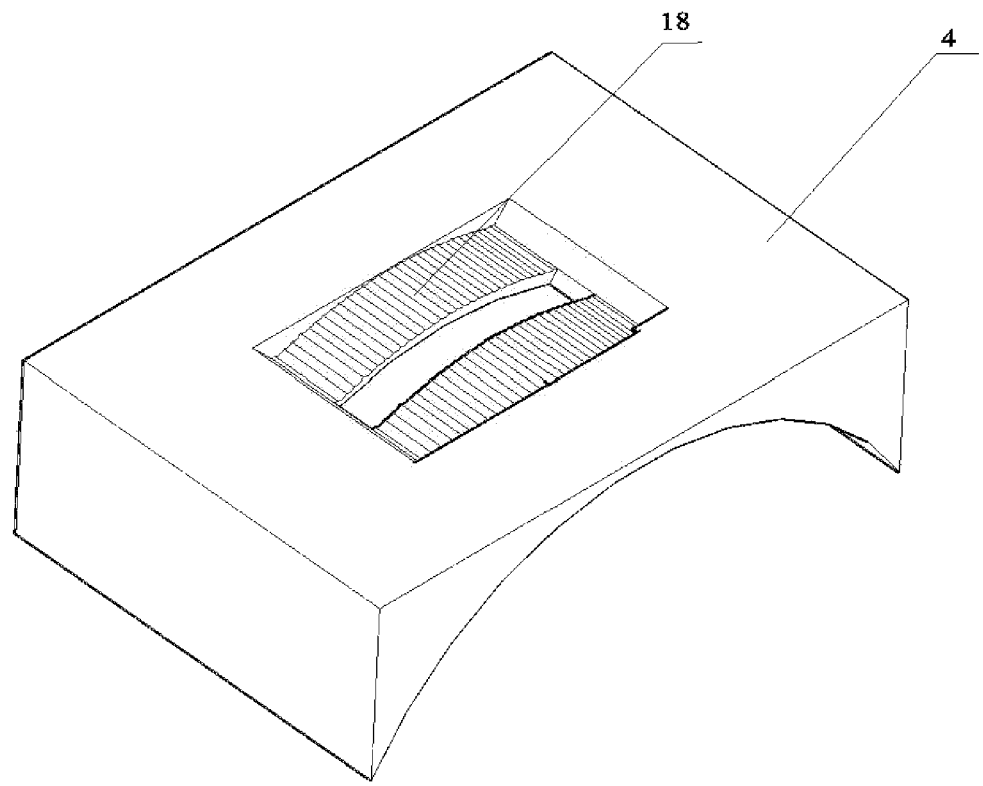
FIG. 6 is a schematic diagram showing an interior structure of a fixed block in an upper pressure disk according to the present disclosure.
Figure 7:
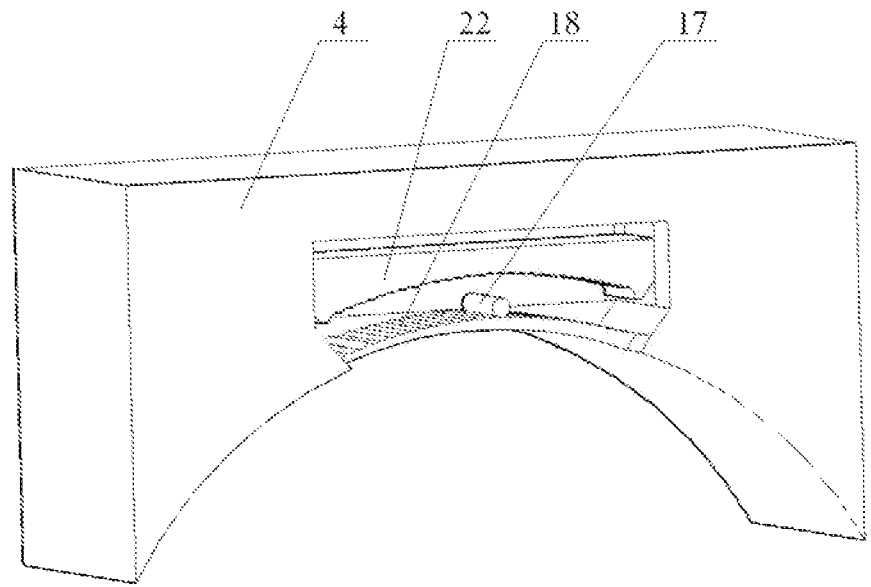
FIG. 7 is a diagram showing a connected relation of a fixed block and a fixed rolling shaft of an arc-shaped groove according to the present disclosure.
Figure 8:
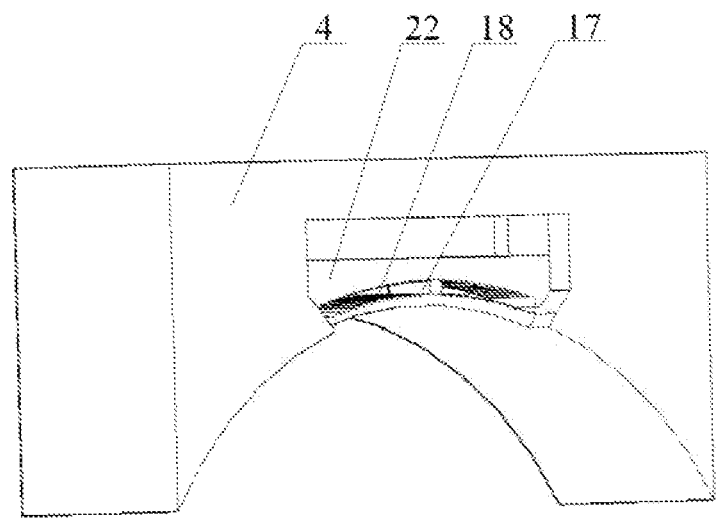
FIG. 8 is an schematic diagram showing that a fixed block and the fixed rolling shaft of the arc-shaped groove are coupling with each other according to the present disclosure.
Figure 9:
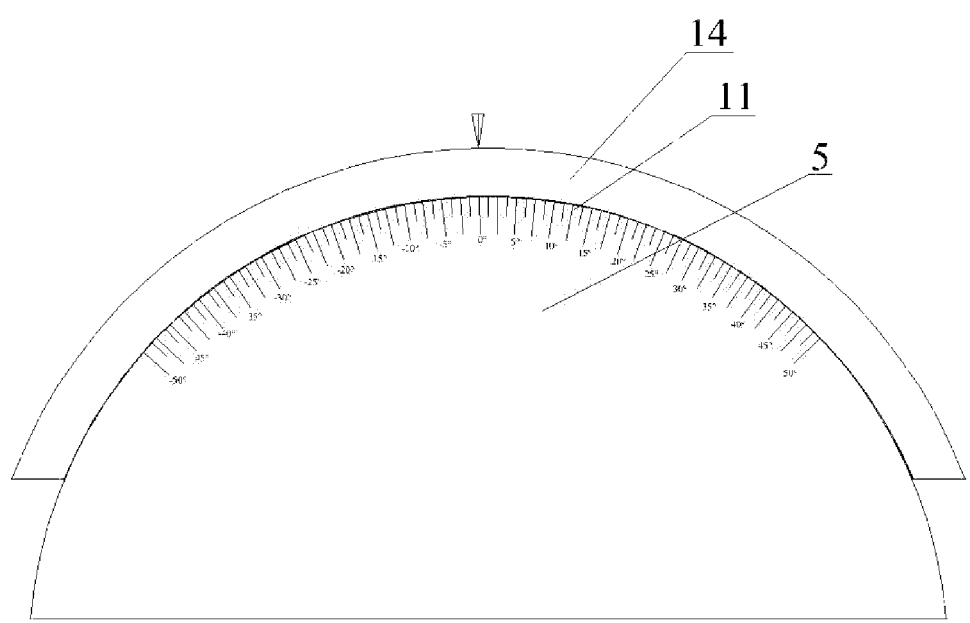
FIG. 9 is a schematic diagram of scales on an upper slideable clamping seat according to the present disclosure.
Figure 10:
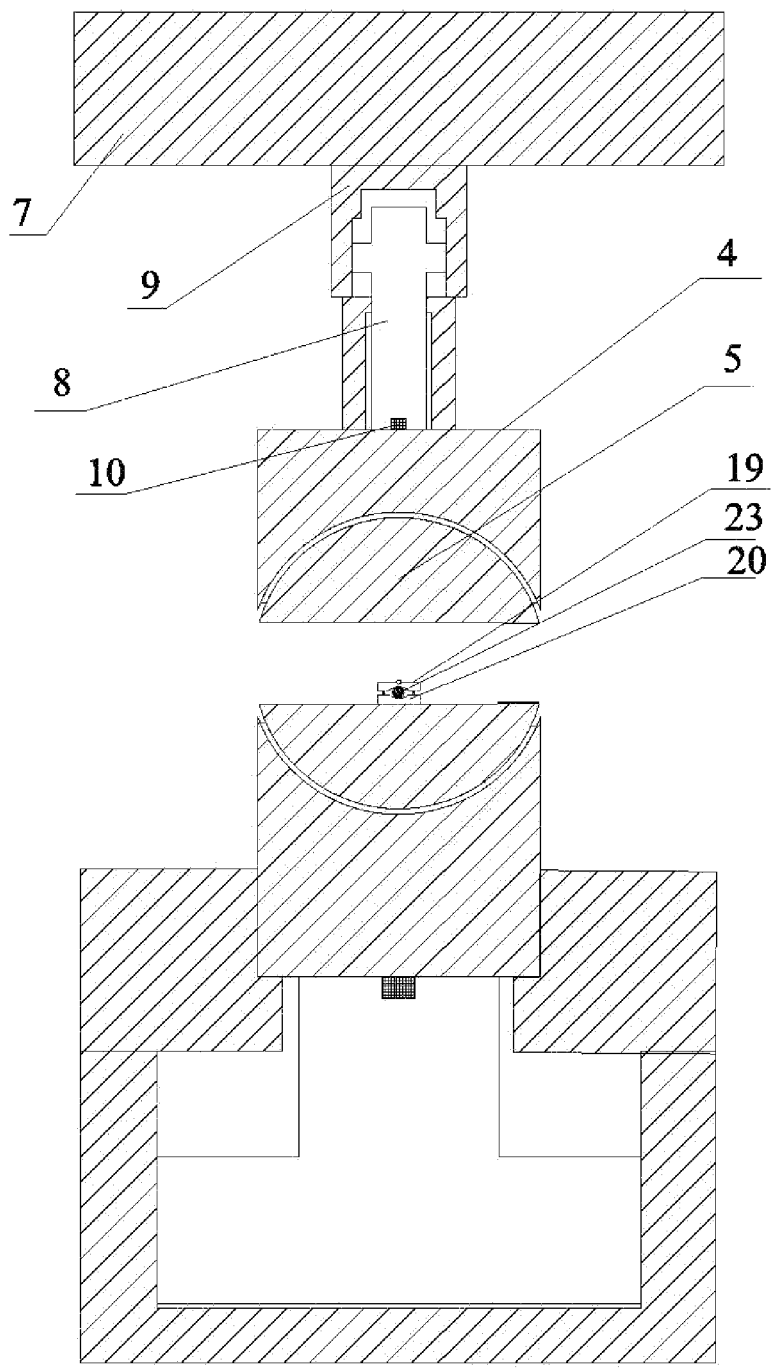
FIG. 10 is a schematic diagram of a force control assembly.

As shown in FIG. 1 to FIG. 10, a device for testing tensile resistance of multiple-row grouped pillars in an inclined goaf includes a testing machine base 1, stands 2, a lower pressure disk 3, an upper pressure disk 4, an upper slideable clamping seat 5, a lower slideable clamping seat 6, a transverse frame 7, a hydraulic pushing shaft 8, a hydraulic oil cylinder 9, pressure sensors 10, scale lines 11, protection rings 12, a hemispherical seat 13, fixed rings 14, fixed bolts 15, arc-shaped clamping blocks 16, fixed rolling shafts 17, arc-shaped grooves 18, upper loading jaws 19, lower loading jaws 20, an upper pressing plate 21 and a force loading device.

The bottoms of the stands 2 are connected with the testing machine base 1, and the tops of the stands 2 are connected with the transverse frame 7; the upper slideable clamping seat and the lower slideable clamping seat are semi-cylindrical blocks, five rows of lower loading jaws that are positioned to have a same central line are arranged on the lower slideable clamping seat 6, the lower loading jaws are welded to the lower slideable clamping seat 6, to test the tensile resistance of one to twenty-five samples together.

The force control assembly includes a hydraulic pushing shaft 8, a hydraulic oil cylinder 9 and pressure sensors 10; the pressure sensors are connected with a microcomputer through a control circuit and is used for accurately controlling a force borne by a corresponding one of the samples; the hydraulic pushing shaft is controlled and adjusted by the hydraulic oil cylinder, so as to load the samples at the same speed or at different speeds and to simulate a situation that the samples are subjected to an uniform pressure force and a non-uniform pressure force; and the scale lines 11 are arranged on the outer edges of both the upper slideable clamping seat and the lower slideable clamping seat, so that the inclination angle is accurately adjusted and controlled.

In the device, the goaf is formed after an inclined coal seam with a tilt angle of −50° to 50° is mined; the grouped pillars include one type of a coal pillar group, an ore pillar group, a filling pillar group, a concrete pillar group, first grouped pillars of mixing coal pillars and filling pillars, second grouped pillars of mixing ore pillars and the filling pillars, and third grouped pillars of mixing the coal pillars and concrete pillars; and the cross sections of the grouped pillars are circular, rectangular, triangular or trapezoidal.

In the device, four protection rings 12 are arranged on the base 1, and each of the four protection rings 12 is installed with a corresponding one of the stands 2.

In the device, the pressure sensors 10 are arranged in the force loading device and are connected with a microcomputer through a control circuit to accurately display the stress state of each sample.

In the device, a first fixed ring of the fixed rings is arranged between the upper pressure disk and the upper slideable clamping seat and the second fixed ring of the fixed rings is arranged between the lower pressure disk and the lower slideable clamping seat, each of the fixed bolts is arranged in the middle of a corresponding one of the first and second fixed ring, to connect the upper slideable clamping seat with the first fixed ring and connect the lower slideable clamping seat with the second fixed ring.

The upper pressure disk and the lower pressure are connected and fixed with the first fixed ring and second fixed ring through the arc-shaped clamping blocks respectively, one of the arc-shaped clamping blocks that is between the upper pressure disk and the first fixed ring has a same structure as an other one of the arc-shaped clamping blocks that is between the lower pressure disk and the second fixed ring, the front end and the rear end of the arc-shaped clamping block are each provided with a fixed rolling shaft, the bottom of the upper pressure disk and the top of the lower pressure disk are each provided with one of the fixed blocks, the fixed block is internally provided with an arc-shaped groove with a hollow interior, the hollow interior of the corresponding one of the arc-shaped grooves is used for placing one of the arc-shaped clamping blocks, the upper bottom surface and the lower bottom surface of the arc-shaped groove are surfaces with recesses, a central angle of each of the recesses of the surfaces is 2°, a corresponding one of the fixed rolling shafts is positioned between the upper bottom surface and the lower bottom surface of the each arc-shaped groove, the rotation angle of the upper slideable clamping seat and the lower slideable clamping seat is adjusted and controlled by rotating each of the fixed rolling shafts to be matched with a corresponding one of arc-shaped grooves, and the inclination angle of the inclined goaf is simulated.

In the device, the upper loading jaw 19 and the lower loading jaw 20 are connected through a directional bearing, and after each of the upper loading jaws and the corresponding one of the lower loading jaws are snap-engaged with each other, an elliptical cavity is formed between the each upper loading jaw and the corresponding one of the lower loading jaws, and is used for placing a respective one of the samples and is used for placing a respective one of the samples, so that eccentric loading of the sample is prevented.

In the device, the length and the width of the lower loading jaw are 150 mm and 150 mm, respectively.

Preferably, the device for testing the tensile resistance of the system of the grouped pillars which is horizontal, but also is capable of testing tensile resistance of the the system of the grouped pillars with variable angles; the tensile resistance of a single sample of coal, rock or filling body is capable of being researched, and the tensile resistance of multiple samples of the system of the grouped pillars including coal, rock and filling body is also capable of being researched.

Preferably, the operating steps of the device include the steps as follows.

In step one, distribution positions, forms and sizes of the grouped pillars remained in a horizontal goaf within a to-be-tested range are researched comprehensively by virtue of technical means for supplementary exploration by utilizing original geological technical data of a mine;

In step two, sizes and a number of the samples to be tested are determined based on information of the grouped pillars remained in the horizontal goaf, where the information is obtained in a step of researching the distribution positions, the forms and the sizes of the grouped pillars remained in the horizontal goaf within the to-be-tested range comprehensively by virtue of the technical means for supplementary exploration by utilizing the original geological technical data of the mine;

In step three, the samples with appropriate sizes are drilled and obtained by using a special coal rock coring machine in a multi-speed manual feeding mode, and the samples are cut and grinded to shapes and sizes required for a test by using the coal rock cutting machine;

In step four, a respective one of the samples is installed in the cavity between each of the upper loading jaws and the corresponding one of the lower loading jaws on the lower slideable clamping seat;

In step five, two parallel loading base lines at two ends of each of the samples along an axis direction of the sample are drawn, and two filler strips are placed along the two loading base lines respectively, and the two filler strips are fixed through a corresponding one of the upper loading jaws and a corresponding one of the lower loading jaws;

In step six, the upper slideable clamping seat and the lower slideable clamping seat are rotated to a target angle;

In step seven, a force value of each of the pressure sensors is reset, and preloading is carried out;

In step eight, a loading speed of the hydraulic pushing shaft is set after the preloading is completed, and loading is carried out;

In step nine, the upper slideable clamping seat and the lower slideable clamping seat is restored to be horizontal, and the hydraulic pushing shaft is controlled to be unloaded by the hydraulic oil cylinder after the loading is completed, and the test is ended.

The above described embodiments of the present disclosure, and it should be noted that the present disclosure is not limited to the above described embodiments, and may be simply modified in accordance with the essence of the present disclosure, those modifications all fall within the scope of the technical scheme of the present disclosure.

What is claimed is:

1. A device for testing tensile resistance of multiple-row grouped pillars in an inclined goaf, the device comprising a testing machine base, stands, a lower pressure disk, an upper pressure disk, an upper slideable clamping seat, a lower slideable clamping seat, a transverse frame, protection rings, a hemispherical seat, fixed rings, fixed bolts, arc-shaped clamping blocks, fixed rolling shafts, arc-shaped grooves, upper loading jaws, lower loading jaws, an upper pressing plate, fixed blocks and a force control assembly, wherein bottoms of the stands are connected with the testing machine base, and tops of the stands are connected with the transverse frame; the upper slideable clamping seat and the lower slideable clamping seat are semi-cylindrical blocks, the lower loading jaws that are positioned to have a same central line are arranged on the lower slideable clamping seat; each of the lower loading jaws is opposite to a corresponding one of the upper loading jaws, the lower loading jaws are welded to the lower slideable clamping seat to test the tensile resistance of samples together; an upper part of the upper slideable clamping seat is connected with the upper pressure disk, and the lower slideable clamping seat is connected with the lower pressure disk; each upper loading jaw of the upper loading jaws and a corresponding one of the lower loading jaws are connected through a directional bearing; and after the each upper loading jaw of the upper loading jaws and the corresponding one of the lower loading jaws are snap-engaged with each other, an elliptical cavity is formed between the each upper loading jaw and the corresponding one of the lower loading jaws, and is used for placing a respective one of the samples, so that eccentric loading of the samples is prevented;

the force control assembly comprises a hydraulic pushing shaft, a hydraulic oil cylinder and pressure sensors; each of the pressure sensors is connected with a microcomputer through a control circuit and is used for accurately controlling a force borne by a corresponding one of the samples; and the hydraulic pushing shaft is controlled and adjusted by the hydraulic oil cylinder, so as to load the samples at a same speed or at different speeds, and to simulate a situation that the samples are subjected to an uniform pressure force and a non-uniform pressure force.

2. The device for testing tensile resistance of multiple-row grouped pillars in an inclined goaf according to claim 1, wherein the goaf is formed after an inclined coal seam with a tilt angle of −50° to 50° is mined; the grouped pillars comprise one type of a coal pillar group, an ore pillar group, a filling pillar group, a concrete pillar group, first grouped pillars of mixing coal pillars and filling pillars, second grouped pillars of mixing ore pillars and the filling pillars, and third grouped pillars of mixing the coal pillars and concrete pillars; and cross sections of the grouped pillars are circular, rectangular, triangular or trapezoidal.

3. The device for testing tensile resistance of multiple-row grouped pillars in an inclined goaf according to claim 1, wherein the protection rings comprise four protection rings arranged on the testing machine base, and each of the four protection rings is installed with a corresponding one of the stands.

4. The device for testing tensile resistance of multiple-row grouped pillars in an inclined goaf according to claim 1, wherein a first fixed ring of the fixed rings is arranged between the upper pressure disk and the upper slideable clamping seat and a second fixed ring of the fixed rings is arranged between the lower pressure disk and the lower slideable clamping seat, each of the fixed bolts is arranged in a middle of a corresponding one of the first fixed ring and second fixed ring, to connect the upper slideable clamping seat with the first fixed ring and connect the lower slideable clamping seat with the second fixed ring;

the upper pressure disk, and the lower pressure disk are connected and fixed with the first fixed ring and second fixed ring through the arc-shaped clamping blocks respectively, one of the arc-shaped clamping blocks that is between the upper pressure disk and the first fixed ring has a same structure as an other one of the arc-shaped clamping blocks that is between the lower pressure disk and the second fixed ring, a front end and a rear end of each of the arc-shaped clamping blocks are each provided with one of the fixed rolling shafts, a bottom of the upper pressure disk and a top of the lower pressure disk are each provided with one of the fixed blocks, each of the fixed blocks is internally provided with a corresponding one of the arc-shaped grooves with a hollow interior, the hollow interior of the corresponding one of the arc-shaped grooves is used for placing one of the arc-shaped clamping blocks, an upper bottom surface and a lower bottom surface of each arc-shaped groove of the arc-shaped grooves are surfaces with recesses, a central angle of each of the recesses of the surfaces is 2°, a corresponding one of the fixed rolling shafts is positioned between the upper bottom surface and the lower bottom surface of the each arc-shaped groove, a rotation angle of the upper slideable clamping seat and the lower slideable clamping seat is adjusted and controlled by rotating each of the fixed rolling shafts to be matched with a corresponding one of the arc-shaped grooves, and an inclination angle of the inclined goaf is simulated.

5. The device for testing tensile resistance of multiple-row grouped pillars in an inclined goaf according to claim 1, wherein scale lines are arranged on outer edges of both the upper slideable clamping seat and the lower slideable clamping seat.

6. The device for testing tensile resistance of multiple-row group pillars in an inclined goaf according to claim 1, wherein a length and a width of each of the lower loading jaws are 150 mm and 150 mm, respectively.

7. A method for testing tensile resistance of multiple-row grouped pillars in an inclined goaf, the method being carried out by a device for testing tensile resistance of multiple-row grouped pillars in an inclined goaf according to claim 1, the method comprising:

researching distribution positions, forms and sizes of the grouped pillars remained in a horizontal goaf within a to-be-tested range comprehensively by virtue of technical means for supplementary exploration by utilizing original geological technical data of a mine;

determining sizes and a number of the samples to be tested based on information of the grouped pillars remained in the horizontal goaf, wherein the information is obtained in a step of researching the distribution positions, the forms and the sizes of the grouped pillars remained in the horizontal goaf within the to-be-tested range comprehensively by virtue of the technical means for supplementary exploration by utilizing the original geological technical data of the mine;

drilling and obtaining the samples with appropriate sizes by using a special coal rock coring machine in a multi-speed manual feeding mode, and cutting and grinding the samples to shapes and sizes required for a test by using the coal rock cutting machine;

installing a respective one of the samples in the cavity between each of the upper loading jaws and the corresponding one of the lower loading jaws on the lower slideable clamping seat;

drawing two parallel loading base lines at two ends of each of the samples along an axis direction of the sample, and placing two filler strips along the two loading base lines respectively, and fixing the two filler strips through a corresponding one of the upper loading jaws and a corresponding one of the lower loading jaws;

rotating the upper slideable clamping seat and the lower slideable clamping seat to a target angle;

resetting a force value of each of the pressure sensors, and carrying out preloading;

setting a loading speed of the hydraulic pushing shaft after the preloading is completed, and carrying out loading;

restoring the upper slideable clamping seat and the lower slideable clamping seat to be horizontal, and controlling the hydraulic pushing shaft to be unloaded by the hydraulic oil cylinder after the loading is completed, and ending the test.

8. The method for testing tensile resistance of multiple-row grouped pillars in an inclined goaf according to claim 7, wherein the goaf is formed after an inclined coal seam with a tilt angle of −50° to 50° is mined; the grouped pillars comprise one type of a coal pillar group, an ore pillar group, a filling pillar group, a concrete pillar group, first grouped pillars of mixing coal pillars and filling pillars, second grouped pillars of mixing ore pillars and the filling pillars, and third grouped pillars of mixing the coal pillars and concrete pillars; and cross sections of the grouped pillars are circular, rectangular, triangular or trapezoidal.

9. The method for testing tensile resistance of multiple-row grouped pillars in an inclined goaf according to claim 7, wherein the protection rings comprise four protection rings arranged on the testing machine base, and each of the four protection rings is installed with a corresponding one of the stands.

10. The method for testing tensile resistance of multiple-row grouped pillars in an inclined goaf according to claim 7, wherein a first fixed ring of the fixed rings is arranged between the upper pressure disk and the upper slideable clamping seat and a second fixed ring of the fixed rings is arranged between the lower pressure disk and the lower slideable clamping seat, each of the fixed bolts is arranged in a middle of a corresponding one of the first fixed ring and second fixed ring, to connect the upper slideable clamping seat with the first fixed ring and connect the lower slideable clamping seat with the second fixed ring;

the upper pressure disk, and the lower pressure disk are connected and fixed with the first fixed ring and second fixed ring through the arc-shaped clamping blocks respectively, one of the arc-shaped clamping blocks that is between the upper pressure disk and the first fixed ring has a same structure as an other one of the arc-shaped clamping blocks that is between the lower pressure disk and the second fixed ring, a front end and a rear end of each of the arc-shaped clamping blocks are each provided with one of the fixed rolling shafts, a bottom of the upper pressure disk and a top of the lower pressure disk are each provided with one of the fixed blocks, each of the fixed blocks is internally provided with a corresponding one of the arc-shaped grooves with a hollow interior, the hollow interior of the corresponding one of the arc-shaped grooves is used for placing one of the arc-shaped clamping blocks, an upper bottom surface and a lower bottom surface of each arc-shaped groove of the arc-shaped grooves are surfaces with recesses, a central angle of each of the recesses of the surfaces is 2°, a corresponding one of the fixed rolling shafts is positioned between the upper bottom surface and the lower bottom surface of the each arc-shaped groove, a rotation angle of the upper slideable clamping seat and the lower slideable clamping seat is adjusted and controlled by rotating each of the fixed rolling shafts to be matched with a corresponding one of the arc-shaped grooves, and an inclination angle of the inclined goaf is simulated.

11. The method for testing tensile resistance of multiple-row grouped pillars in an inclined goaf according to claim 7, wherein scale lines are arranged on outer edges of both the upper slideable clamping seat and the lower slideable clamping seat.

12. The method for testing tensile resistance of multiple-row grouped pillars in an inclined goaf according to claim 7, wherein a length and a width of each of the lower loading jaws are 150 mm and 150 mm, respectively.

\* \* \* \* \*